Patented Apr. 26, 1938

2,115,073

UNITED STATES PATENT OFFICE 2,115,073

SALAD DRESSING AND FLAVORING THEREFOR

Dean C. Ingraham, Contra Costa County, Calif., assignor to The Glidden Company, Cleveland, Ohio, a corporation of Ohio No Drawing. Application February 6, 1936, Serial No. 62,633

4 Claims. (Cl. 99—140)

This invention relates to salad dressings of the type comprising emulsions of edible oil, and has particular reference to a new and novel method of incorporating flavoring ingredients into mayonnaise and other similar salad dressing. It relates further to a new type of flavoring ingredient and a method for preparing the same.

Mayonnaise is essentially an emulsion of water and salad oils, with eggs, vinegar and other flavoring ingredients such as sugar, salt, and spices. The added flavoring ingredients are generally added as solids, although sugar and salt can of course be added in water solution. The spices, however, occur and are added as solid powders, as they are insoluble in water. While necessary ingredients of any dressing, the use of these powdered spices is open to several serious objections.

In the first instance, the additions of powders to the emulsion of oil and water has a tendency to break the emulsion, due probably to the fact that the dry spice absorbs water locally from the emulsion, disturbing the equilibrium at the oil-water interface. Although this is not a serious problem where strong spices are used in small quantities, it presents some difficulty where a mild spice like paprika is used, which must be added in substantial quantity to get the desired added flavor.

The second objection, like the first, is more serious with mild spices like paprika. This objection is based on the fact that the smooth pleasing texture of the unseasoned emulsion is broken up by particles of spice, with the result that the salad dressing has much less eye appeal to prospective customers.

A third objection is applicable only to highly colored spices such as paprika and red pepper and is due to the solubility of the color in the salad oil. This causes blotches of color to appear around the paprika particles, and this blotchy appearance grows successively worse as the mayonnaise grows older, the size of the blotches being actually a rough index of the age of the mayonnaise. Although the color can be readily dispersed, it is obviously impossible to do this on the dealer's shelves; and the public is suspicious of such a product. Furthermore, the spice color principles are often fugitive, and the color may become even more blotchy due to uneven length of exposure to light.

Further, spices vary from time to time and from batch to batch in flavor, color and strength. This necessitates a careful check on each batch of salad dressing to insure uniformity of taste and color.

The presence of micro-organisms on the spices ordinarily presents real difficulties, as there are often present bacteria which hasten the spoilage of the salad dressing by hastening decomposition of the egg ingredients, fermenting the sugars, etc. It is obviously impossible to treat these dry spices to remove bacteria, so that this trouble occurs from time to time, and is perhaps one of the most serious with which the manufacturer must contend.

I have discovered that all of these disadvantages may be overcome, and the entire beneficial effect of the spice colors and taste be retained, by first extracting the spices with salad oil. I have found that all the color and taste imparting ingredients of spices are soluble in such oils, either at room temperature or at slightly higher temperatures. The resultant solution may be standardized as to strength, to eliminate differences in spice shipments; the absence of solid particles eliminates the principal objections to spices in mayonnaise; and the extract has the further advantage that the taste imparting principles, being in solution, are immediately detectable, in distinction from the effect of the solid particles, which is slower.

Furthermore the filtration process necessary to remove the spice solids from the oil extract also removes the yeasts and other bacteria present, so that a sterile solution ordinarily results which obviously does not hasten spoilage. In the event that non-filterable bacteria are present, it is possible to sterilize the extract by heating up to 212° F. or more, as disclosed below; this must be done in the absence of air if destruction of the spice color and flavor is to be avoided. The same heat treatment on dry spices results in undesirable loss of flavor, caramelization and other undesirable reactions.

I have found that with some flavors, salad oil gives a selective extraction, recovering the desirable flavors, and leaving the less desirable, so that extraction produces a flavor superior to the whole spice.

I have also discovered that the color of the oil extracts of the more highly colored spices may be stabilized by heating under vacuum, so that the fading due to the exposure of the salad dressing to light may be overcome for all practical purposes.

The following examples are illustrative of my invention:

Example 1—White pepper extract

One hundred grams of refined cottonseed salad oil were mixed well with 10 grams of ordinary powdered white pepper, and the mass allowed to stand for 24 hours. The extract was filtered from the solids on a Buchner filter. The cake had a very mild taste, while the oil was quite peppery. A second extraction of the cake just like the first, gave a mild extract oil, and practically a tasteless cake. A third extraction removed the last trace of flavor from the cake. The last two oil extracts were used for extracting fresh pepper, using the common counter-current method of insuring good extraction. One gram of the extract is equivalent to about 0.1 gram of white pepper, and may be substituted therefor in mayonnaise and salad dressing formulas.

Example 2—Black pepper extract

Black pepper is not used in mayonnaise because of its objectional color, its use resulting in a mayonnaise which looks flyspecked. As white pepper is merely decorticated black pepper, it is rather more expensive; and a salad oil extract of black pepper was made up, following the exact procedure of Example 1, to compare results. A comparison of the extracts obtained from black pepper and white, under substantially identical conditions, indicated that the cheaper black pepper extract was practically identical with the white pepper extract.

Example 3—Thyme extract

Thyme is a plant of the mint family, having a sage-like flavor, the ground up leaves and flower tips being used as an aromatic flavoring; it is an especially desirable ingredient of highly-seasoned dressings. Ten grams of the powder was extracted in counter-current with successive 100 gram portions of corn salad oil, the first one at room temperature, followed by four others at 120° F., filtering between extractions. The first extract was a dark greenish yellow, with a sage-like smell and taste. The residual cake had a very bitter taste; and mayonnaise flavored with the extract was somewhat more palatable than mayonnaise flavored with the whole spice, indicating that the oil had a selective action on the taste principles, extracting the more pleasant constituents first.

Example 4—Red pepper

A counter-current extraction of red pepper was made, using 10 grams of red pepper, and 100 gram portions of sesame salad oil. One extraction at room temperature, and three at 120° F., removed all the pepper flavor from the cake, and left a light tan powder.

Example 5

A large scale extraction of red pepper, using 50 pounds of pepper and successive 500 pound portions of sesame salad oil, gave results similar to the above. The residual cake was pressed in a high pressure oil expeller, and a residual cake containing 7.5% of oil was obtained. The cake was of such constitution that it could be mixed with stock feed.

Example 6

One thousand seven hundred pounds of ground Spanish paprika was extracted with 8,715 pounds of sesame salad oil by agitation at room temperature. Two hours contact time was sufficient for the extraction. The solid particles were separated by filtration through a plate and frame press. Eight thousand four hundred and forty-three pounds of clear extract with a red color and rich paprika flavor was obtained. The press was washed with 2,200 pounds of sesame oil and this oil saved for a subsequent extraction. One thousand nine hundred and seventy-two pounds of press cake was collected on the filter press. This filter press cake was pressed in a high pressure hydraulic press to further reduce the oil content. The finished hydraulic cake made a good stock food, having the following analysis:

|  | Per cent |
|---|---|
| Moisture | 7.5 |
| Oil | 7.5 |
| Crude fiber | 15.0 |
| Crude protein | 12.8 |
| Ash | 7.0 |
| Nitrogen-free extract (carbohydrates) | 50.2 |

Example 7—Vacuum treatment to stabilize the color and sterilize the spice

The rich red colored paprika extract of Example 6 was given the following heat treatment under vacuum. Two thousand two hundred pound batches of the extract were placed in a closed tank under a 27½ inch vacuum. The extract was heated by means of steam coils to 345° F. in two hours. The extract was kept at 345° F. for 30 minutes and dropped to a cooling tank provided with cold water coils and a vacuum. It was maintained under vacuum until cooled to room temperature and was then filtered through cloth. The finished extract was a deep orange red and carried a rich paprika odor and flavor.

The vacuum heat treated oil extract was compared with the raw extract, by blending 10% of each extract with a water-white sesame salad oil (Lovibond color 10y—1.2r). The raw extract oil mixture was a pink shade, while the treated mixture was a rich yellow. The two mixtures were placed in test tubes in a window, exposed to the afternoon sun through glass. Within a week, the untreated extract mixture had changed color, to practically the same shade as the treated mixture, proving that the heat treatment had removed the easily faded colors, and insured color stability.

Samples of mayonnaise were made up, according to Formula #1 below, using untreated and treated extracts. The sample with the untreated extract had a disagreeable pinkish color, while the treated sample was clean and of a pleasing creamy color. On exposure to the sun in jars, through a window, the mayonnaise with the treated extract was still O. K. as to color and appearance after three weeks. The untreated mayonnaise was yellow on the side toward the window after a day, but still pink on the opposite side, giving a streaked appearance. After three weeks, it was uniformly cream colored close to the glass, but the inside was still pink.

I believe that the vacuum heat treatment destroys the more readily faded colors, which are destroyed first by the sun's rays. In the case of paprika, I believe that the capsanthin is broken down, while the xanthophylls and beta carotene remain to give the product the pleasing color.

The heat treatment to destroy the undesirable colors also acts to sterilize the extract, and is an additional safeguard against spoilage.

The heat treatment should be carefully regulated, in order to insure against destruction of flavor or desirable color. In no case should the heating take place in the open air, as this not only injures the flavor of the salad oil and promotes rancidity, but injures the spice flavors and colors, which become muddy.

Instead of using vacuum, the paprika solution can be heated and cooled in an atmosphere of an inert gas such as carbon dioxide or nitrogen. There is less loss of flavor by the distillation of the essential oils in the inert gases than under vacuum, and it is desirable to treat many of the spice extracts in inert gases. The vacuum treatment is ideal for paprika since paprika is used for its rich, nutty flavor rather than the hot, pepper flavor, the mild grades of paprika being highly prized. The loss of some of the hot flavor in the vacuum process permits a low grade paprika to be converted into a more expensive mild grade.

*Example 8—Heat treatment in inert gas*

The paprika solution of Example 6 made in the refinery by extracting 1,700 pounds of ground paprika with 8,715 pounds of sesame salad oil, was used to get an exact comparison with the procedure of Example 7. A kilogram of the extract was heated in a flask in an atmosphere of carbon dioxide. One hour was required to bring the temperature to 350° F. and the temperature maintained at 350° F. for twenty minutes. The extract was cooled to room temperature in twenty minutes. A rich flavored extract remained with a slight sour taste due to dissolved $CO_2$. This $CO_2$ flavor decreases on standing and is not noticeable in the salad dressings at the concentrations used. However, if the dissolved $CO_2$ proved objectionable, it could be easily removed with vacuum at room temperature. The color quality was equal to the vacuum treated extract with respect to loss of red, and the non-fading property.

For spices containing very volatile essential oils, I prefer the inert gas treatment to the vacuum treatment; and I also prefer to operate under pressures substantially above atmospheric to reduce the loss due to volatilization of the spice principles.

To destroy the fadable colors in highly colored spices, it is necessary to heat the solutions at temperatures above the boiling point of water, unless the heating is continued for such an unreasonable length of time as to make the cost prohibitive. Even at temperatures as high as 280° F., a seven hour treatment is ineffective to remove all of the fading color from the extract of Example 6. I prefer to operate at 350° F. because this gives me the fastest treatment safely effective with ordinary equipment. Flash heating at higher temperatures might be used; but even at 400° F., with tank heating, the non-fading color principles are affected.

This treatment can be applied effectively to spices other than paprika, but spices such as red pepper are used in such small quantities that the treatment to stabilize color is of little importance. However, it is advisable to treat all the spice extracts under vacuum or inert gas, to sterilize them in order to retard the tendency toward spoilage.

The salad oil extracts of spices, either as made without further treatment, or as treated in Example 7, can be used to great advantage to replace the dry spices, in various types of salad dressing, of which the following are typical:

|  | Formula 1 | Formula 2 | Formula 3 | Formula 4 |
|---|---|---|---|---|
|  | Mild mayonnaise | Medium spicy | Spicy mayonnaise | Whipped salad dressing |
|  | Percent | Percent | Percent | Percent |
| Salad oil | 79.438 | 79.238 | 78.538 | 38.248 |
| Water |  |  |  | 30.00 |
| Whole egg | 8.40 | 8.40 | 8.40 |  |
| Egg yolk |  |  |  | 5.00 |
| Vinegar (50 grain) | 8.90 | 8.90 | 8.90 | 10.00 (100 grain) |
| Sugar | 1.20 | 1.20 | 1.20 | 9.50 |
| Salt | 1.50 | 1.50 | 1.50 | 1.75 |
| Essential oil of mustard | .002 | .002 | .002 | .002 |
| Paprika extract of Example 7 | 0.56 | 0.56 | 0.56 | 0.60 |
| Red pepper extract of Example 4, sterilized by heating to 212° F. in $CO_2$ |  | 0.20 |  |  |
| Black pepper extract of Example 2 sterilized in nitrogen |  |  | 0.90 | 0.90 |
| Cereal |  |  |  | 4.0 |

It should be pointed out that the amount of red pepper extract in Formula 2 is equivalent to .02% powdered red pepper. It would be impossible to mechanically distribute such a small amount of powdered spice in a mayonnaise and get uniform distribution.

While I have shown but a few spices, the oil extraction process is available for all spices, with one exception. Mustard does not yield its essential oil on oil extraction, as this is developed only by treatment with water to hydrolyze certain constituents of the mustard. This essential oil is available in a synthetic form, or it may be prepared from mustard itself. Other edible oils than those shown can likewise be used effectively.

These oil extracts of spices can be used most effectively in prepared dressings, but the salad oil itself may be used to advantage for preparing mayonnaise and the like in the home, as a smoother dressing can be made in this manner.

Essential oils may, of course, be steam distilled from the spices or separated with volatile solvents. Not only are these methods more expensive than my process, but these essential oils very often lack the true flavor of the spice. The flavors of spices are very often due to a blend of essential oils, and in the separation of the essential oils, particularly by steam distillation, the essential oils are separated, the natural blend altered and the delicate flavor lost. Further, the pure essential oils tend to polymerize and oxidize with loss of flavor. The synthetic flavors are never equal to the natural spices. Further than this, the sometimes desirable coloring effect of the spices is lost.

Vinegar is also sometimes used to extract spices. The solubility of the spice flavors in vinegar is so small that the flavors are extracted slowly, months being sometimes required. The quality of the flavor is rather poor, being often changed by the action of the acid. Vinegar is corrosive to most metals so this presents a difficulty, particularly for long time extractions. Further, vinegar is a good solvent for many of the other spice constituents (sugars, etc.) which are undesirable in the extract, and are insoluble in salad oil. Lastly, the low solubility of the spices, and the small amount of vinegar needed in most dressings, prevents the incorporation of really substantial amounts of spice by this method.

By means of these new spice extracts, the manufacturer of salad dressing can prepare a smoother emulsion, a better-looking original product, less liable to spoilage, resistant to fading, more uniform in flavor, with a lower cost of spices, as the uniform distribution obtained makes possible the use of less flavoring. By using the heat treated extracts of the spices, stabilized color and freedom from bacteria can be obtained; and by incorporating thyme extract in place of dry thyme, the flavor is improved. Further, these extracts have the true spice flavors, as distinguished from prior art extracts.

I claim:

1. The method of making a light resistant flavoring composition which comprises extracting a highly colored spice with an edible oil, separating the extract from the spice solids, and heating the exact under non-oxidizing conditions to destroy the easily light-fadable coloring constituents without destroying the more light-resistant coloring constituents.

2. The method of making a light resistant flavoring composition which comprises extracting a highly colored spice with an edible oil, separating the extract from the spice solids, and heating the extract under vacuum to destroy the easily light-fadable coloring constituents without destroying the more light resistant coloring constituents.

3. The method of making a light resistant flavoring composition which comprises extracting a highly colored spice with an edible oil, separating the extract from the spice solids, and heating the extract in an inert atmosphere to destroy the easily light-fadable coloring constituents without destroying the more light resistant coloring constituents.

4. The method of making a light resistant flavoring composition which comprises extracting paprika with an edible oil, separating the extract from the spice solids, and heating the extract under non-oxidizing conditions to destroy the easily light-fadable coloring constituents without destroying the more light resistant coloring constituents.

DEAN C. INGRAHAM.

CERTIFICATE OF CORRECTION.

Patent No. 2,115,073.  April 26, 1938.

DEAN C. INGRAHAM.

It is hereby certified that error appears in the printed specification of the above numbered patent requiring correction as follows: Page 4, first column, line 22, claim 1, for the word "exact" read extract; and that the said Letters Patent should be read with this correction therein that the same may conform to the record of the case in the Patent Office.

Signed and sealed this 28th day of June, A. D. 1938.

(Seal)

Henry Van Arsdale,
Acting Commissioner of Patents.

and the small amount of vinegar needed in most dressings, prevents the incorporation of really substantial amounts of spice by this method.

By means of these new spice extracts, the manufacturer of salad dressing can prepare a smoother emulsion, a better-looking original product, less liable to spoilage, resistant to fading, more uniform in flavor, with a lower cost of spices, as the uniform distribution obtained makes possible the use of less flavoring. By using the heat treated extracts of the spices, stabilized color and freedom from bacteria can be obtained; and by incorporating thyme extract in place of dry thyme, the flavor is improved. Further, these extracts have the true spice flavors, as distinguished from prior art extracts.

I claim:

1. The method of making a light resistant flavoring composition which comprises extracting a highly colored spice with an edible oil, separating the extract from the spice solids, and heating the exact under non-oxidizing conditions to destroy the easily light-fadable coloring constituents without destroying the more light-resistant coloring constituents.

2. The method of making a light resistant flavoring composition which comprises extracting a highly colored spice with an edible oil, separating the extract from the spice solids, and heating the extract under vacuum to destroy the easily light-fadable coloring constituents without destroying the more light resistant coloring constituents.

3. The method of making a light resistant flavoring composition which comprises extracting a highly colored spice with an edible oil, separating the extract from the spice solids, and heating the extract in an inert atmosphere to destroy the easily light-fadable coloring constituents without destroying the more light resistant coloring constituents.

4. The method of making a light resistant flavoring composition which comprises extracting paprika with an edible oil, separating the extract from the spice solids, and heating the extract under non-oxidizing conditions to destroy the easily light-fadable coloring constituents without destroying the more light resistant coloring constituents.

DEAN C. INGRAHAM.

CERTIFICATE OF CORRECTION.

Patent No. 2,115,073.            April 26, 1938.

DEAN C. INGRAHAM.

It is hereby certified that error appears in the printed specification of the above numbered patent requiring correction as follows: Page 4, first column, line 22, claim 1, for the word "exact" read extract; and that the said Letters Patent should be read with this correction therein that the same may conform to the record of the case in the Patent Office.

Signed and sealed this 28th day of June, A. D. 1938.

(Seal)

Henry Van Arsdale,
Acting Commissioner of Patents.

CERTIFICATE OF CORRECTION.

Patent No. 2,115,073. April 26, 1938.

DEAN C. INGRAHAM.

It is hereby certified that error appears in the printed specification of the above numbered patent requiring correction as follows: Page 4, first column, line 22, claim 1, for the word "exact" read extract; and that the said Letters Patent should be read with this correction therein that the same may conform to the record of the case in the Patent Office.

Signed and sealed this 28th day of June, A. D. 1938.

(Seal)

Henry Van Arsdale,
Acting Commissioner of Patents.